US009348421B2

(12) United States Patent
Weston et al.

(10) Patent No.: US 9,348,421 B2
(45) Date of Patent: May 24, 2016

(54) GESTURE AND TOUCH-BASED INTERACTIVITY WITH OBJECTS USING 3D ZONES IN AN INTERACTIVE SYSTEM

(71) Applicant: Float Hybrid Entertainment Inc, San Francisco, CA (US)

(72) Inventors: Kevin Weston, Ross, CA (US); Steven Chen, Alameda, CA (US)

(73) Assignee: FLOAT HYBRID ENTERTAINMENT INC., San Francisco, CA (US)

( * ) Notice: Subject to any disclaimer, the term of this patent is extended or adjusted under 35 U.S.C. 154(b) by 0 days.

(21) Appl. No.: 14/315,311

(22) Filed: Jun. 25, 2014

(65) Prior Publication Data

US 2015/0002388 A1      Jan. 1, 2015

Related U.S. Application Data

(60) Provisional application No. 61/839,846, filed on Jun. 26, 2013, provisional application No. 61/951,499, filed on Mar. 11, 2014.

(51) Int. Cl.
*G06F 3/01* (2006.01)
*G06F 3/03* (2006.01)

(52) U.S. Cl.
CPC .............. *G06F 3/017* (2013.01); *G06F 3/0304* (2013.01)

(58) Field of Classification Search
None
See application file for complete search history.

(56) References Cited

U.S. PATENT DOCUMENTS

2005/0285738 A1*  12/2005  Seas et al. ..................... 340/557

* cited by examiner

*Primary Examiner* — David D Davis
(74) *Attorney, Agent, or Firm* — ECOTECH LAW GROUP, P.C.

(57) ABSTRACT

An interactive, zone-based installation enables a user to interact with an object, such as a retail product, an appliance, a food item, a poster, a non-touch screen monitor, an object of nature, or any other of a number of various items. A user approaches the object and reaches for it. The installation displaying the object has a sensor such as a camera. The sensor is coupled to a processor and continuously feeding an image depth buffer stream. Within the field of view of the sensor is a 3D zone. The zone is strategically positioned near or around the object. When a user reaches for the object there is a change in the depth buffer data stream. If this change exceeds time and sensitivity thresholds implying an intentional gesture by the user, an output event is triggered by the processor.

11 Claims, 8 Drawing Sheets

GESTURE AND TOUCH-BASED INTERACTIVITY WITH OBJECTS USING 3D ZONES IN AN INTERACTIVE SYSTEM

CROSS-REFERENCE TO RELATED APPLICATIONS

This application claims priority under U.S.C. §119(e) to U.S. Provisional Application No. 61/839,846 filed Jun. 26, 2013, entitled "GESTURE AND TOUCH BASED INTERACTIVITY WITH OBJECTS USING ZONES WITHIN A DEPTH SENSOR FRUSTRUM", and U.S. Provisional Application No. 61/951,499 filed Mar. 11, 2014, entitled "GESTURE AND TOUCH BASED INTERACTIVITY WITH OBJECTS USING ZONES WITHIN A DEPTH SENSOR FRUSTRUM", which are hereby incorporated by reference in their entirety.

BACKGROUND OF THE INVENTION

1. Field of the Invention

The present invention relates to software, computing devices, and sensors for creating interactive systems. More specifically, it relates to software for creating zones with respect to objects and detecting changes in zones to initiate output events.

2. Description of the Related Art

It is becoming increasingly prevalent in our day-to-day lives to experience interactivity with objects ranging from monitors to appliances to retail products. People are more accustomed to walking up to, most commonly, a screen or monitor and expecting to touch it and interact with it. Many retailers are using interactivity to showcase or demonstrate appliances, consumer electronics, and other retail goods in stores, as well as in public places. However, currently this interactivity, often based on hand gestures, body movements, or touch is often too costly and is still difficult to implement and maintain in many environment. For example, implementing a touch screen for a large display monitor is very expensive. This is especially true when a wider range of objects is considered. For example, in order for an object to be interactive, such as a monitor, an appliance, a car in a showroom, a poster, or an item on a shelf, the object often has to be powered on or electrically functional, that is, plugged in and turned on. In addition, the hardware needed can be intrusive, vulnerable to damage, or impracticable depending on the setting. The components needed, such as sensors and processors, often must be connected to the object in some manner, often electronically. Often, standard detection techniques using sonic or magnetic sensors cannot be used. Many of the current systems also rely on having to scan for a skeletal image (such scanning is often not optional). Many of the interactive objects and systems today also require that the user touch a screen or surface or hold something which can lead to increased potential of spreading germs and may not be sufficiently hygienic in many environments (for example in schools or hospitals).

Given drawbacks of systems providing hand and gesture based interactivity, together with their increasing prevalence in more facets of society (home, work place, public spaces, retail stores, schools, museums, hospitals, and so on), an improved system and method of implementing such interactivity with two and three dimensional objects is needed. Such methods and systems should have a number of benefits. For one, the sensors should not have to have any type of connection to the interactive object. The object can be 2D, like a poster or surface, or 3D and there should minimal restrictions on its size, shape and environment. Moreover, the interactive object can be a physical or natural object that does not need to be powered on or be functional, that is, it should not need to have a power source. Thus, nearly any type of object can be interacted with, including a natural object, such as a tree, a plant or rock, a poster, a work of art, furniture, clothes, appliances, consumer electronics, household goods, none of which should need to be powered on or connected to the interactive apparatus in any manner. It would be preferable if the set-up and configuration of the interactive system be as generic as possible. The complexity of the set-up should only be dictated by the conditions and environment that the object is in (e.g., subject to inclement weather, confined to a small space, subject to high volume of users/traffic, not near a power source, and so on) and the sensitivity of the depth sensor. There are other desirable features of such a system, such as detecting close proximity, rather than actual physical contact or touch or not requiring a skeletal image of a hand or face in order to be interactive. Finally, the system and method of implementing hand and gesture based interactivity should be inherently low-cost and require minimal hardware, such as a depth sensor, a processor, and a means for output (e.g., a speaker, monitor, etc.).

One motivation for conceiving an improved hand and gesture based interactive system arises from a need to engage potential customers in an increasingly challenging retail environment and doing so in a cost-effective and simple way where the product (interactive object) need not be connected to any other physical means of communication.

SUMMARY OF THE INVENTION

The present invention is an interactive, zone-based installation, system, and software, featuring one or more objects that a user is able to interact with. The object can be a retail product, an appliance, a food item, a poster, a non-touch screen monitor, an object of nature, or any other of a number of various items. In one typical scenario, a user approaches the object and reaches for it with the intention of touching it or picking it up. The installation displaying or containing the object has one or more sensors, such as cameras or depth sensors. The sensors are electronically coupled to a processor and continuously feed the processor with an image depth buffer stream. Within the field of view or frustrum of the sensors are one or more 3D zones, a virtual space defined and programmed by the installation provider. The zones are programmed using zone detection and analysis applications so that they are strategically positioned near or around the object.

When a user reaches for the object there is a change in the depth buffer data stream. If this change in the data stream exceeds time and sensitivity thresholds and possibly other conditions implying an intentional gesture by the user, an output event is triggered by the processor. This output event may be showing a video on a nearby monitor, playing an audio file, turning on lights, or initiating a mechanical device. As noted, the sensor and processor are connected. What is notable is that the object may be stand-alone and unpowered. If it is an appliance, it does not have to be turned on or physically connected in any manner to the sensor, processor or output device. If the object is a monitor (for example, as part of an appliance door), it does not have to have touch screen capability. However, with the present invention, the monitor will have touch screen functionality by virtue of defining one or more zones in front of the monitor. Any object can be made interactive by strategically installing a processor, a sensor, and an output component, such as a low-cost monitor and/or speaker in the object's setting or environment.

BRIEF DESCRIPTION OF THE DRAWINGS

References are made to the accompanying drawings, which form a part of the description and in which are shown, by way of illustration, specific embodiments of the present invention.

DETAILED DESCRIPTION OF THE INVENTION

Figure 1:
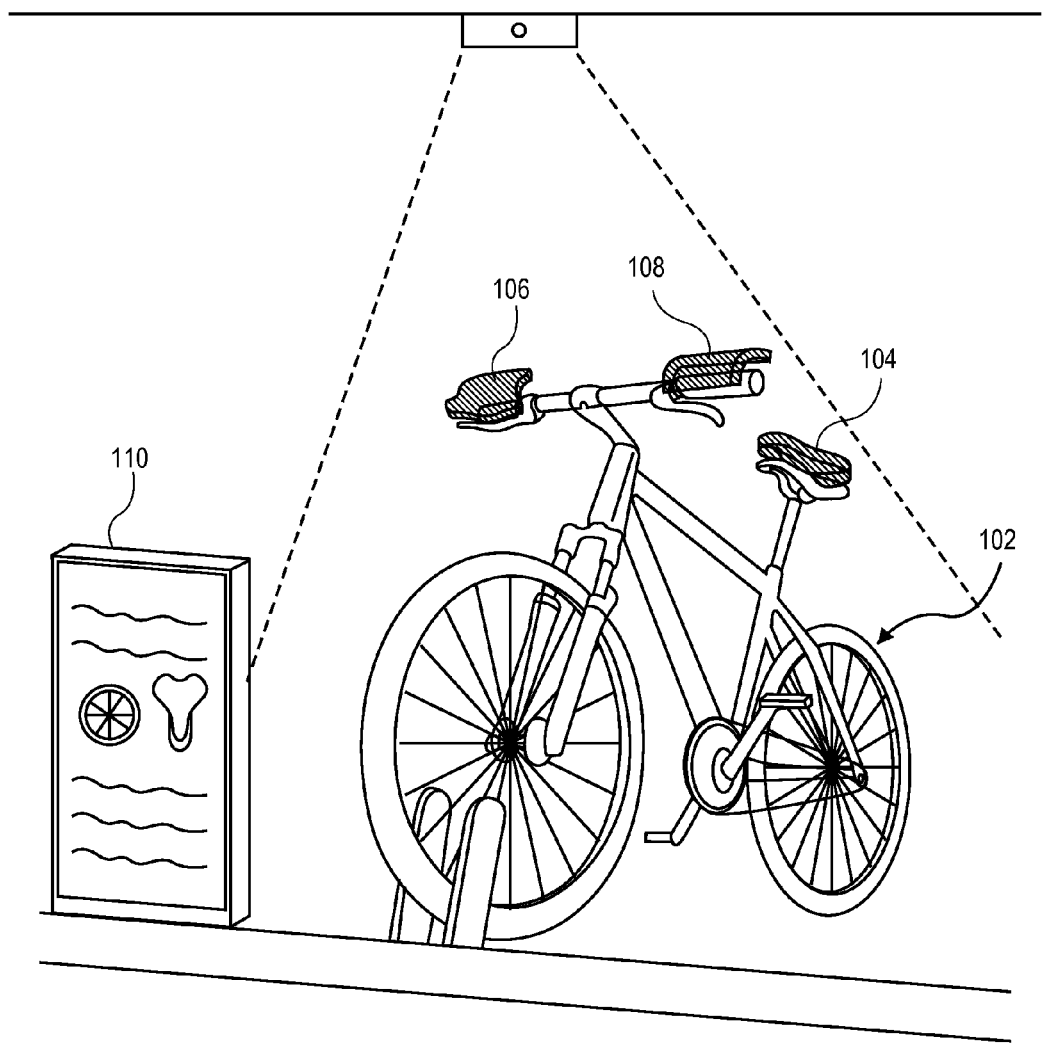
FIG. 1 is an illustration of a retail product having three zones in accordance with one embodiment.

Example embodiments of an interactive zone-based system to enable interactivity between users and objects are described. These examples and embodiments are provided solely to add context and aid in the understanding of the invention. Thus, it will be apparent to one skilled in the art that the present invention may be practiced without some or all of the specific details described herein. In other instances, well-known concepts have not been described in detail in order to avoid unnecessarily obscuring the present invention. Other applications and examples are possible, such that the following examples, illustrations, and contexts should not be taken as definitive or limiting either in scope or setting. Although these embodiments are described in sufficient detail to enable one skilled in the art to practice the invention, these examples, illustrations, and contexts are not limiting, and other embodiments may be used and changes may be made without departing from the spirit and scope of the invention.

In one embodiment, the present invention provides audio, visual, or other information about a product or object to a potential customer or interested party when the user places their hand close to it. More generally, a user interacts with an object and triggers output events. More complex triggers, such as identifying the difference between a door opening or closing, are also possible. The interaction can create output in various forms. These include an audio message, images on a monitor, a mechanical event (lighting, motors, etc.), a media presentation, updating a database, opening a Web browser, playing music, initiating a game engine, and so on.

Embodiments for using image data from depth sensors to drive touch and gesture based interactive experiences are described in the various figures. Systems of the present invention allow any 2D or 3D physical object, surface, image, or display to respond to localized movement and proximity of a user, specifically hands, fingers, arms of a user, or inanimate objects. As noted above, the 2D or 3D object being interacted with may include a wide range of objects, nearly anything that would make sense to interact with. The object can be of arbitrary size and orientation.

The described embodiment has the following basic components, modules, and data. The object (i.e., the object being interacted with) is described above. It is worth repeating that the interactive object does not need to be connected to the sensor system, such as cameras and even if the object is something that requires a power source to operate, the object does not need to be powered on.

Another component is the depth sensor or camera. One or more can be used, depending on the setting. The sensor/camera produces an image data stream that consists of a series of image frames where pixels contain encoded distances of objects within the view frustrum of the sensor/camera. As is known in the art, depth data consist of x and y coordinates and color to indicate depth. The system also includes a processor that is able to process the image data stream (depth buffer input data). The scalability of the processor is dependent on the desired quality of the feedback. For example, if the interactivity involves only basic audio (i.e., the person interacting with the object only hears audio, such as music or spoken word), the processor need not be that powerful or scalable. At the other end of the spectrum, if the interactivity involves high-end graphics and audio, a stronger processor or one with higher specifications would be preferred.

Finally, the system requires analysis/authoring software that is enables identification of "zones" of interest and sensitivity levels of those zones. As described in greater detail below, the software is also designed to link positive detection in a zone to an event trigger interface (through an API) that other software applications, such as a game engine, database program, or media presentation software, can use.

In another embodiment, the zone-based interactive system with depth sensors can be used in a number of different environments and scenarios, as illustrated by the use cases. These environments or spaces may be categorized in a number of ways. In many cases they are in retail spaces (stores, show rooms, etc.) or in public spaces (information kiosks, boards or walls, and the like), but can be in a variety of different settings. In one embodiment, the interactive systems may be categorized into 1) Objects; 2) Shelves; and 3) Screens. The first category, Objects, include primarily physical objects and the volumetric space around them. Of course, the variety of physical things that fall into this category is expansive and can include natural objects (rocks, trees, plants) and non-electrical or non-mechanical things, such as furniture. For example, an object may be a bike as shown in FIG. 1. There a bike 102 is on display at a store or in a show room. A zone-based system can be programmed to create zones around certain parts of bike 102. These may be parts that customers put their hands on, such as the handle bars and seat. FIG. 1 shows three zones: a zone 104 surrounding the top of the seat and zones 106 and 108 around the handlebars. If a customer puts her hand near or on the seat or handle bars, the zones will be broken and, in one embodiment, information will be displayed on a nearby monitor 110 or an audio file may play. For example, if a customer puts her hand on a handle bar, information is provided via audio and on monitor 110, specifically about handle bar features. As described herein, the system would only react if a hand was in the zone for a certain amount of time suggesting or indicating that the customer intended to touch or show interest in the component (e.g., seat, handle bar, frame, etc) of bike 102. Zones 104-108 may take any appropriate shape or form, such as shown in FIG. 1. Methods for customizing or shaping a zone to suit a particular component are described herein. Zones may be composed of a basic shape, such as a cube, which has very small dimensions. For example, a cube may be one cubic millimeter or one cubic centimeter large. This may be characterized as the common building block or common denominator of zones in a particular zone-based interactive system. A collection of these building blocks may then be customized, "carved" or sculpted to suit a particular object or component of an object.

In another example, the object may be any type of consumer good, such as an appliance, e.g., a range or dish washer. The zones are any user (consumer)-relevant spaces around them, such as space around the handles, controls, knobs and the like. Another category may be described generically as shelves. The goal here is to make the retail space more appealing to consumers and to potentially customize interactivity with a specific consumer (this concept may also apply to the object and screen categories). Using the zone-based interactive system of the present invention, shelves can be described as being "responsive." For example, if a consumer in a retail environment picks an item off a shelf, an audio file may be activated or if a consumer approaches a shelf, a video may start on a nearby monitor, similar to the attract modes described above.

Figure 2:
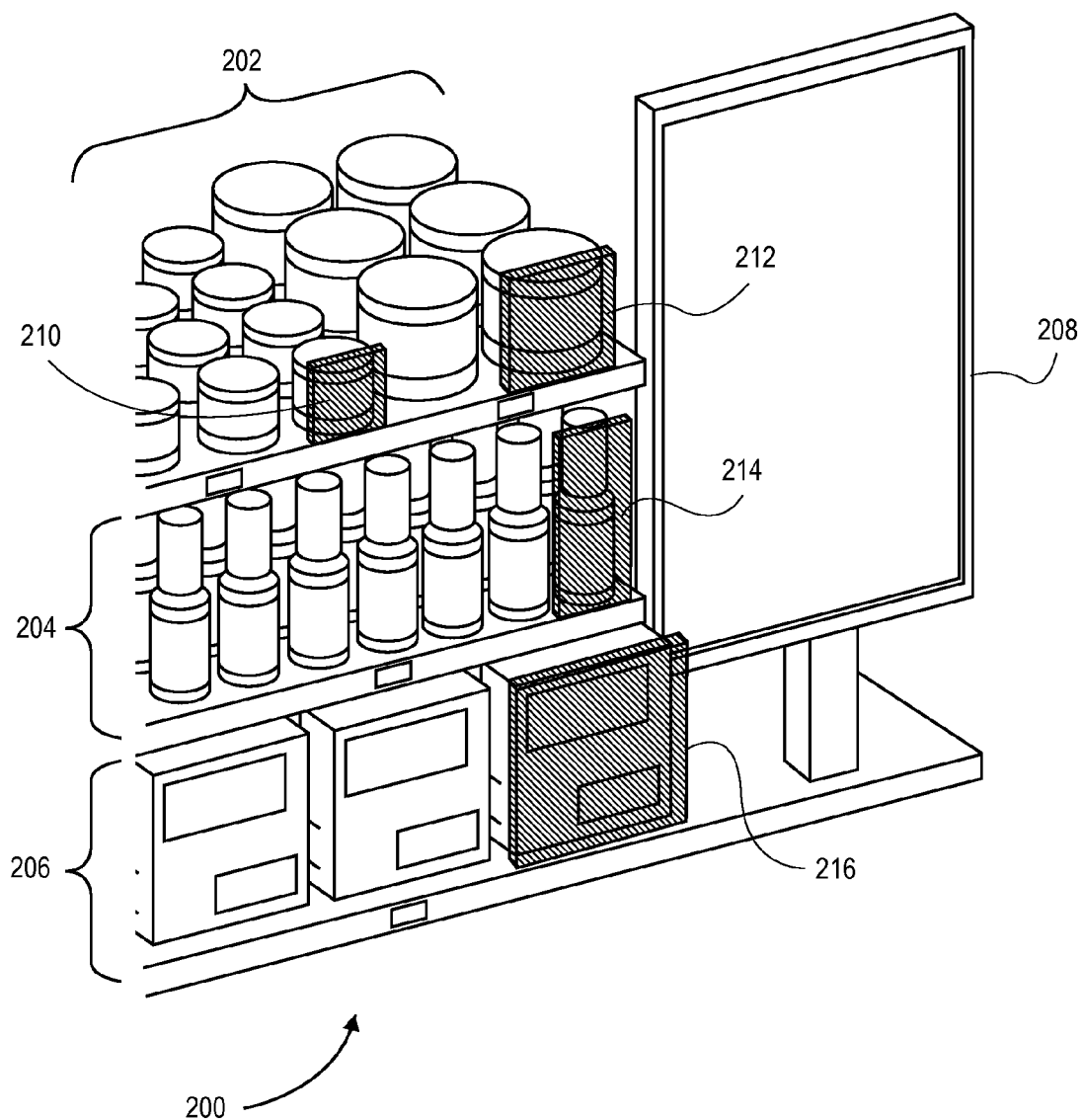
FIG. 2 is an illustration of a shelf in a store holding consumer goods and showing zones in front of the products in accordance with one embodiment.

FIG. 2 is an illustration of a shelf in a store holding consumer goods. A shelf 200 holds products 202-206. In one embodiment there is also a monitor 208 that can display information on the consumer goods or whatever information the retailer wants to display. As a consumer reaches for a product on the shelf, one or more zones may be disrupted. Zones 210-216 are shown in front of certain items. In other embodiments, there may be zones in front of all the items. If a zone is disrupted by a hand reaching for an item, an event may occur. Zones 210-216 can be of different shapes and forms to suit the items on the shelf. In another example, if all the items on one shelf are the same or similar, one zone to cover all of them or the entire shelf may be sufficient.

Embodiments for using data provided by depth sensors and using this data to activate touch and gesture-based interactive experiences are described in the various figures. Systems of the present invention allow a 3D physical object, surface (effectively 2D), image, or display to respond to localized movement and proximity of other objects, such as hands, fingers, and arms. As noted above, the object being interacted with (for example, a product on a shelf, the bike or appliances as noted above) may include a wide range of objects, nearly anything that can be touched. The object can be of arbitrary size and orientation. In other embodiments, the system can be used in attract modes where a user is not reaching for an item or part of an object, but rather is walking towards the object, for example, from straight ahead or from the side.

Important aspects of the zone-based interactive system include zonal shape and position and zonal depth. As noted, zones can take the form of various shapes, any shape that is suitable given the specific object or that is suitable for the area where the object resides (e.g., an entire shelf or an area). The zones may have arbitrary shapes, such as zones 104, 106 and 108 around the handle bars and seat of the bike, or planar as shown near the fridge door, pyramidal, conical, tubular, and so on. The position of the zone relative to the object is selected or designed by the programmer and retail operator (or other suitable entity). The shapes of the zones will generally be dictated by how users will likely interact with the object, as described with the bike and fridge door above. In many cases users will use their hands or fingers, but a user may move their head or face into a region or use their legs or feet; zones may be designed to address these situations. These factors and others will determine, in part, where the zones should be positioned and what shape they should be.

These factors will also determine the depth of the zone. For example, if the object is a poster, door, or banner and the zone system designers want people to bring their fingers very close to the surface to trigger an event (they can touch the surface if they want to, but it is not necessary), then the zone may be thin and close to the surface. This is illustrated in the fridge door setting. If the designers want an event (e.g., video or audio activation) triggered when a user's fingers or hands are, for example, six inches away from the surface, the zone may have a different depth. As noted, there may be rounds of sensing, that is, zone disruption detection in different zones, each zone disruption being a pre-condition for the next zone disruption before an event is triggered. One implementation of this is layered zonal areas of different shapes. Here a first zone having a first shape must receive stimulus (meeting its own magnitude and duration conditions) before a second zone having a second shape (or same shape) can be triggered which, in turn, can be a pre-condition to a third zone being triggered, and so on. A zone may also have the requirement that it receive stimulus at the same time as another zone. For example, an appliance, such as a refrigerator, shown in FIG. 3.

A small fridge 302 has a physical door 304 which is comprised, in part, of a monitor that faces the user. In this example, the monitor or screen shows images of bottles. In one embodiment, the screen is not a touch-screen. In a conventional setting, nothing would happen if a user physically touched the monitor on door 304. Also, in this embodiment, refrigerator 302 is not powered. There are three planar zones 306, 308, and 310 in front of door 304. These zones were designed and programmed to be relatively thin, flat, and have the dimensions of door 304. In another embodiment, there may also be multiple zonal planes (not shown) perpendicular to door 304 (and, as such, also perpendicular to zones 306-310). There are a number of ways to disrupt a zone in this setting. The most likely way of breaking zones 306-310 in this example occurs when a user tries to touch the screen on door 304 expecting that it is a touch screen. Another likely scenario where zones are disrupted is a user trying to open refrigerator 302. In both cases, the user's hand penetrates zones 306-310 and triggers an event. By virtue of implementing the zone-based interactive system of the present invention, the monitor on door 304 has the functionality of a touch screen even though refrigerator 304 and the screen are not powered on.

There may be many more zones in front of outermost zone 310. These zones can be used to detect users directly approaching the fridge. As a user walks up to the fridge, an event may be triggered when the user is still 5 or 6 feet away from the door, which can be referred to as attract mode. Zones that are perpendicular to door 304 and extend out from the door can be used to enable a side attract mode. That is, an event can be triggered if a user walks towards the fridge from the side instead of from the front. When a user passes from the side, these perpendicular zonal planes are disrupted and an event is triggered, such as an image changing or an audio file playing.

Figure 3:
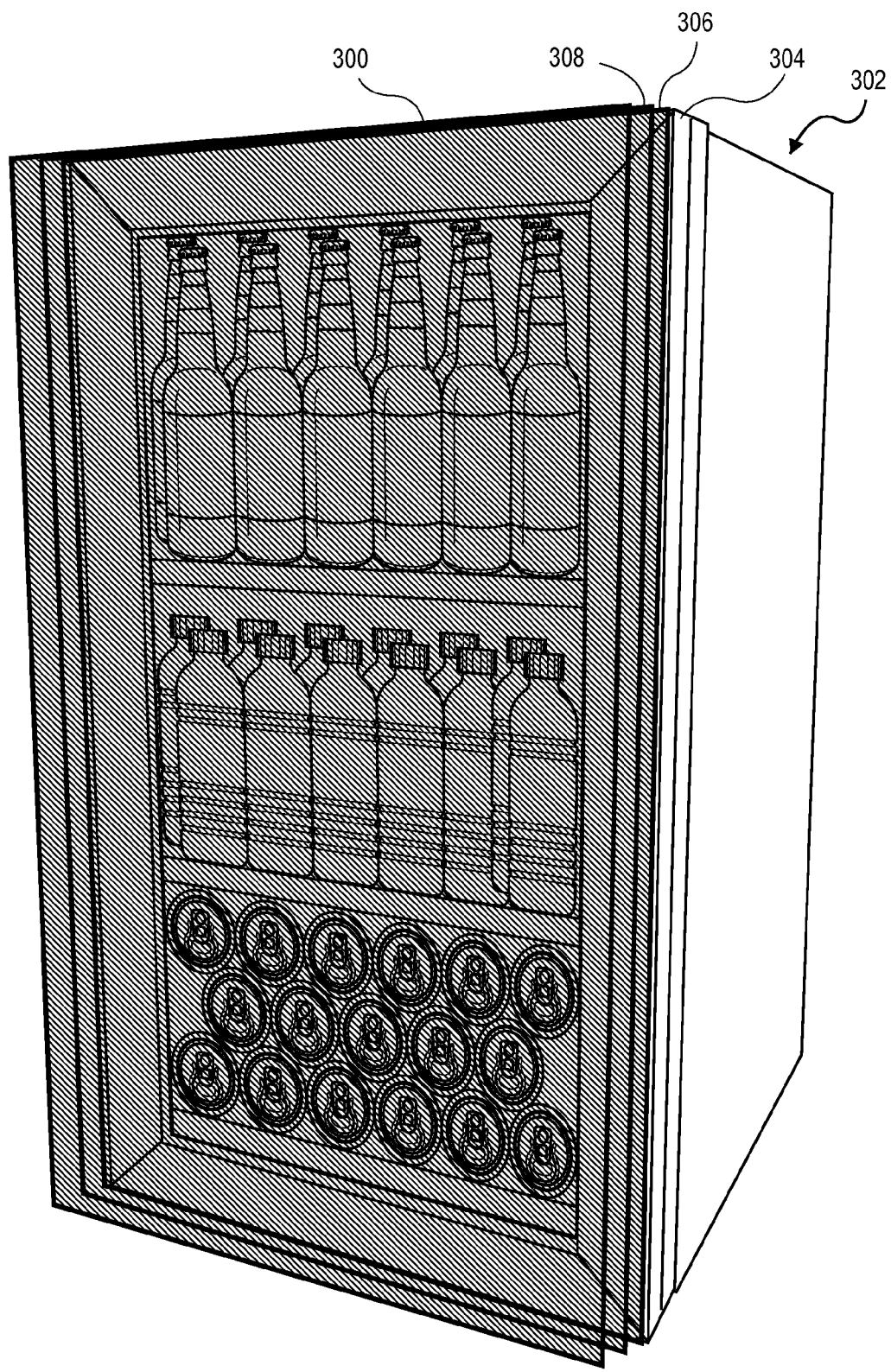
FIG. 3 is an illustration of a screen on a refrigerator door showing planar zones in front of the door in accordance with one embodiment.

As described above, the other category may be referred to as Screens and is illustrated with the refrigerator example in FIG. 3. A consumer or passer-by can step up to a screen, shelf, or object from the front, referred to as a regular attract. In this case, the sequential zones are configured in a specific way, that is, in a manner where they are broken as a consumer approaches the screen or shelf from the front. There may also be a side attract configuration in which the zones are placed in a manner where they are broken if a passer-by approaches the shelf or screen from the side. Each of these has sequential zones for different attracts. In another embodiment, there may be a plane-breaking response in which a user may use a finger to press a button on the screen. Keeping in mind that the screen itself is not a touch screen (it may be a poster or any flat surface which is not electronic or powered on), the response that is triggered is from the finger breaking a series of zones in front of the visual representation of an object, such as a knob, button, or bottle as shown in FIG. 3, where the screen is part of a door. Once the door is opened, the system can look for other zones inside the refrigerator which may be disrupted by the user's hand or body entering the space behind the door. It is useful to note here that, in the various embodiments, time/duration of a disruption or stimuli may be measured by the number of frames a hand, arm, or other object is disrupting a zone.

In one embodiment, data may be collected by the zone-based interactive system of the present invention and these data may be used for various types of analytics. For example, a shelf containing a range of consumer products can be tracked or monitored to measure how often consumers choose one product versus another, if consumers picked up a product and put it back, or how long they considered a certain product. In another example, a physical object such as a bicycle or an automobile in a showroom can be tracked. The interactive system can measure the time or frequency consumers spend looking at specific zones or areas such as the brakes, seats, or gearing systems. This information can then be tied to inventory information or marketing strategy to enhance or customize inventory stocks or advertising information in specific locations. In another embodiment, the data collected may be utilized for user profiling and providing content updates remotely. For example, a consumer may be running an app on a mobile device while in a store and customized updates may be pushed to the consumer's mobile device using the zone-based system described above. When a zone is triggered the system knows that a user is in sufficiently close proximity to potentially broadcast a near field communications protocol. If that user has a device such as a mobile phone or tablet, and that device has an application installed that is listening for notifications, this system can take advantage of that and push data to that device.

As is apparent from the description above, creating zones of specific depth and shape and having the option of sequential responses (where multiple zones need to be disrupted) makes the system of the present invention practicable and gives it utility in real-world retail and other settings. In one embodiment, a zone, for example, a trapezoidal-shaped zone (e.g., the natural shape of the depth camera field of view or frustrum), may be comprised of small cubes. The system of the present invention uses an optical system to view a space and that there is a camera frustrum to consider.

Duration of zone disruptions, measured in one embodiment using frames from the depth camera(s), may be used to determine, to some extent, the intent of the user. For example, is it an intentional swipe across zoned area where the user is intends to act, such as change a page, move something over, and the like, or is the hand movement simply an inadvertent waving or passing of a hand, where the user does not have any specific intent?

In one embodiment, there is an algorithm to implement sequential zone treatment. A space is defined having more than one contiguous zone. The goal is to determine if those zones are triggered in a specific sequence within a defined time period. If one zone is triggered, a timer is started that looks for changes in the other zone. If the timer expires without that other zone being disrupted, then no action is triggered. If the first zone is disrupted and the other zone is broken immediately afterwards, then a sequential action has occurred and the system can trigger an event based on this. The number of zones that in a triggered event is arbitrary beyond two zones. For example, a space described by 5 contiguous zones can trigger an event if all five zones are triggered in a specific order within a set time limit.

In one embodiment a process for using the data extracted from depth sensor camera systems to drive touch and gesture based interactive experiences is described. One of the goals is to create a system that allows any real 3D physical object, physical surface, image or display to respond to localized movement and the proximity of other objects which can include hands, fingers, arms, or inanimate objects.

One component is an interactive object that can be any real physical object such as a car, a door, an appliance, or an image printed on paper. The interactive object does not need to be connected to the sensor system in any way and can be of arbitrary size and orientation.

The depth camera or sensor does not have to be of a specific brand or camera model. One embodiment assumes a data stream that consists of a series of image frames where pixels that constitute the image contain the encoded distances of objects within the view frustrum of the camera or sensor.

The basic hardware requirement is a computing device with the ability to process depth buffer input data. The scalability of this device is dependent on the desired quality of the feedback. For example, basic audio-only applications will not require high-end graphics and CPU power. Graphics and audio-intense applications will require higher spec machines.

The analysis/authoring software is designed to identify zones of interest and sensitivity levels of those zones. This software is also designed to link positive detection in a zone to an event trigger interface (API) that other software applications can use. These other software applications can be web browsers, game engines, database packages, or other media presentation software.

Figure 4:
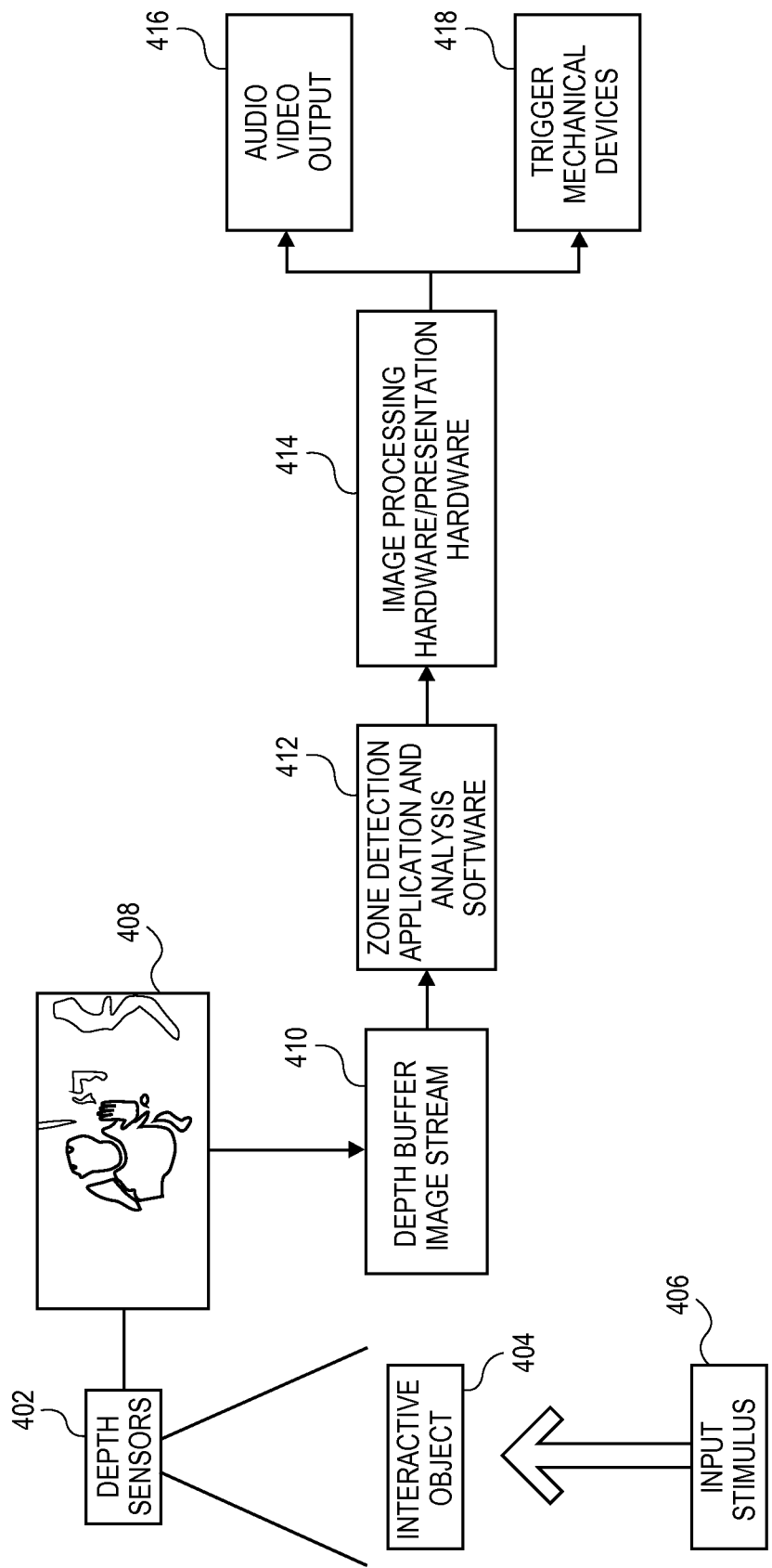
FIG. 4 is a flow diagram showing the object, sensors, and data flow in accordance with one embodiment of the present invention.

FIG. 4 is a flow diagram showing the object, sensors, and data flow in accordance with one embodiment. Component 402 represents the depth cameras or sensors each having a field of view that includes the object 404. An input stimulus 406, such as a user's hand, body part, or any inanimate object, is viewed or captured within the depth sensor frustrum. An image from the sensor is shown as image 408. These images create a depth buffer image stream 410. As noted, the image stream is encoded with depth information (rather than visible light image data). Lighter colors indicate areas closer to the sensor/camera and darker colors indicate areas or objects further away.

Depth buffer image stream 410 is input to zone detection application and analysis software 412. As described below, zone detection application software 412 enables the provider to define the size, sensitivity, orientation, shape, and other characteristics of the zones of the depth image. Analysis software 412 computes changes within each zone and decides whether or not to trigger an output event. One manner of refining zone detection algorithms is by combining the output of the analysis software module with other data, such as skeletal information, voice, or video image information.

FIG. 4 also shows image processing and presentation hardware 414 which includes one or more processors. This hardware computes changes in each of the zones and also runs feedback from the zones that lead to output events. The result of the processing done may be audio/video output 416 or triggered mechanical devices 418, such as motors and lights.

Expanding on step 412, a Zone Detection Application allows the provider to define the size and orientation of zones or trigger areas of the depth image. Analysis Software computes changes within each zone and decides whether or not to trigger an output event. As noted, the results of this software can be combined with skeletal information, voice, and video image information to refine the zone detection algorithms.

Figure 5:
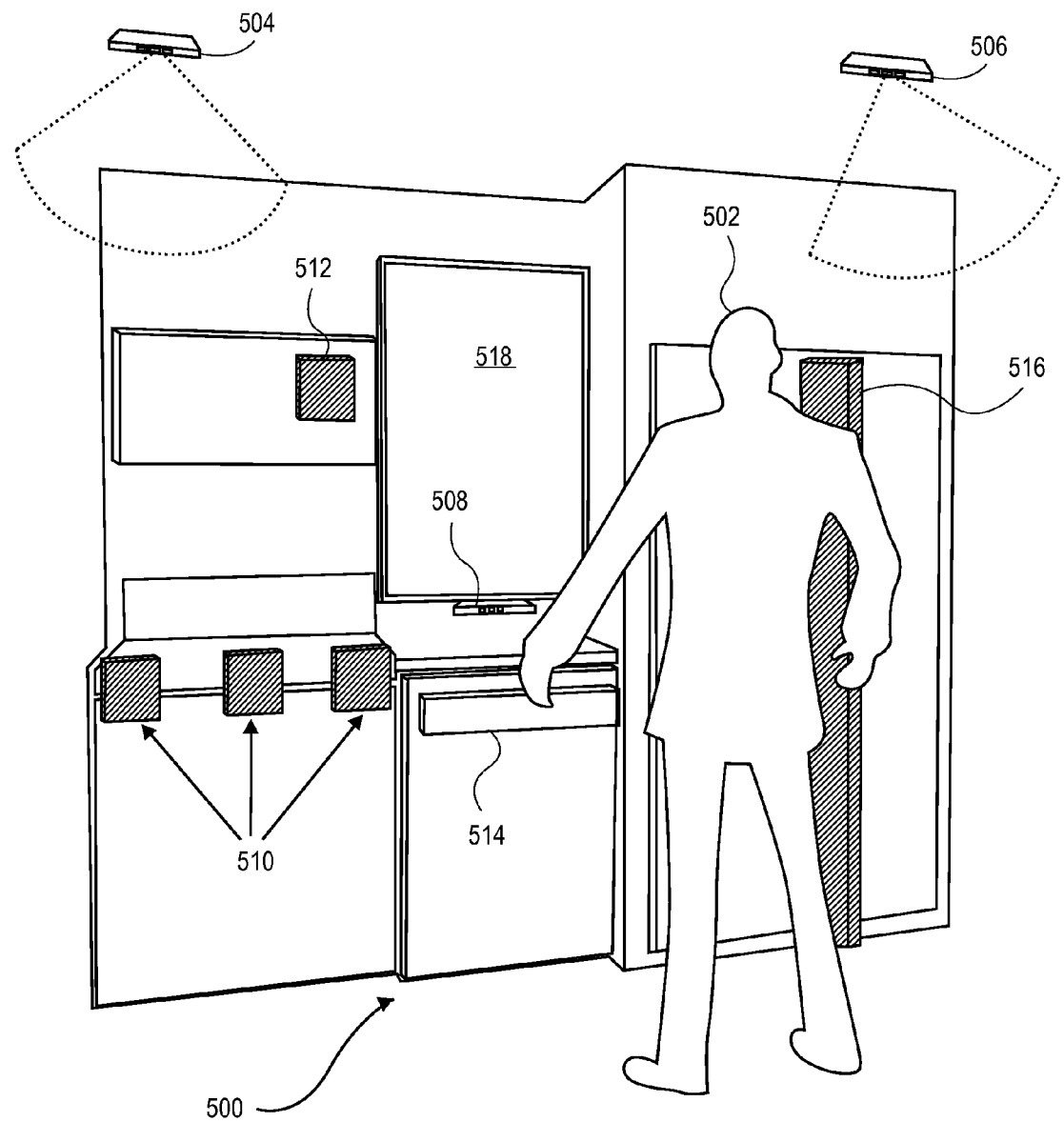
FIG. 5 is an illustration of a user in a kitchen appliance display area showing sensors, zones, and a monitor for showing an output event in accordance with one embodiment.

FIG. 5 is an illustration of a user in a kitchen appliance display area showing sensors, zones, and a monitor for showing an output event in accordance with one embodiment. A retail display area 500 is constructed with standard, unaltered kitchen appliances, such as a refrigerator, oven, and microwave, none of which contain their own sensors for interactivity. The goal of display 500 is to create an interactive experience for user 502 that explains the features and benefits of the appliances. It is important to note that the appliances are non-functional, not powered on, and may be switched for other appliances. The present invention enables creation of an interactive display allowing customers to manipulate the appliances, detect which specific controls are being used and display information on a monitor 518. Because of the setting, standard detection techniques that use sonic sensors, magnetic sensors, and other types of sensors cannot be used. In one embodiment, depth sensors 504 and 506 are used to drive the experience based on manipulation by user 502 of the appliances. A sensor 508 may be used for skeletal detection and voice control input.

Sensors 504 and 506 are mounted above display 500 and point down. These sensors are used to detect changes in zones within the view frustrum of each sensor. Sensor 508 is used to detect the movement of human bodies in front of display 518 which is connected to a computer (not shown) which drives information to be displayed on monitor 518.

User 502 approaches display area 500. Sensor 508 uses skeletal tracking to identify the position of user 502. This tracking triggers initial feedback and display of information on monitor 518. User 502 approaches the refrigerator and opens the door. Sensor 506 detects that the door has been opened by detecting disruption in zone 516 and displays relevant information on monitor 518. User 502 walks to the microwave above the oven and opens the microwave door. Sensor 504 detects that user 502 is opening the door because of disruption in zone 512 and displays product information on monitor 518. User 502 may then turn the left knob on the stove disrupting zone 510 on the left of the stove. This disruption is detected by sensor 504 and monitor 518 then displays information on the stove.

As noted there are three sensors in FIG. 5 and each is connected to a computing device via USB, Bluetooth, or Ethernet connection. Sensors 504 and 506 point down and use only a depth map to track when objects enter zones 510 and 512. Sensor 508 uses skeletal tracking and voice input to correlate depth sensor data from sensors 504 and 506. A host computing device (not shown in FIG. 5 but described in FIGS. 8A and 8B) processes the depth image buffer stream from sensors 504 and 506 and may also process skeletal tracking and voice input data.

Display or monitor 518 is one example of an output event presentation device. In this embodiment, it is a standard non-touch flat screen monitor and is optional. The presentation can be audio only or the host computing device can trigger mechanical devices such as motors and lights.

Software running on the host computing device includes the device operating system which depends on the type of sensors used in the installation. The other software running on the device includes sensor driver software. As is known in the art, all sensors have proprietary driver software that controls the output from the sensors and presents it to another application.

The software running on the computing device that is most relevant to the present invention is the zone detection authoring software, described in greater detail below. This software allows the provider to define and program the zones and allows the provider to determine virtual volumes of the depth image stream that the analysis software, described below, needs to be aware of.

The other relevant software is the zone analysis software that allows the provider to analyze detection zones 510, 512, and 516 for changes in depth information. This information is correlated with skeletal and video image information to determine whether there has been a disruption in one of the zones and whether the disruption passes certain thresholds and other conditions thereby triggering an output event. Finally, the computing device may also execute software related to the output event, such as media presentation software for playing a video on monitor 518, a web browser, game engines, or other custom presentation software that can receive messages from the analysis software and drives the relevant presentation, audio content, video content, or the triggering of mechanical devices.

Figure 6:
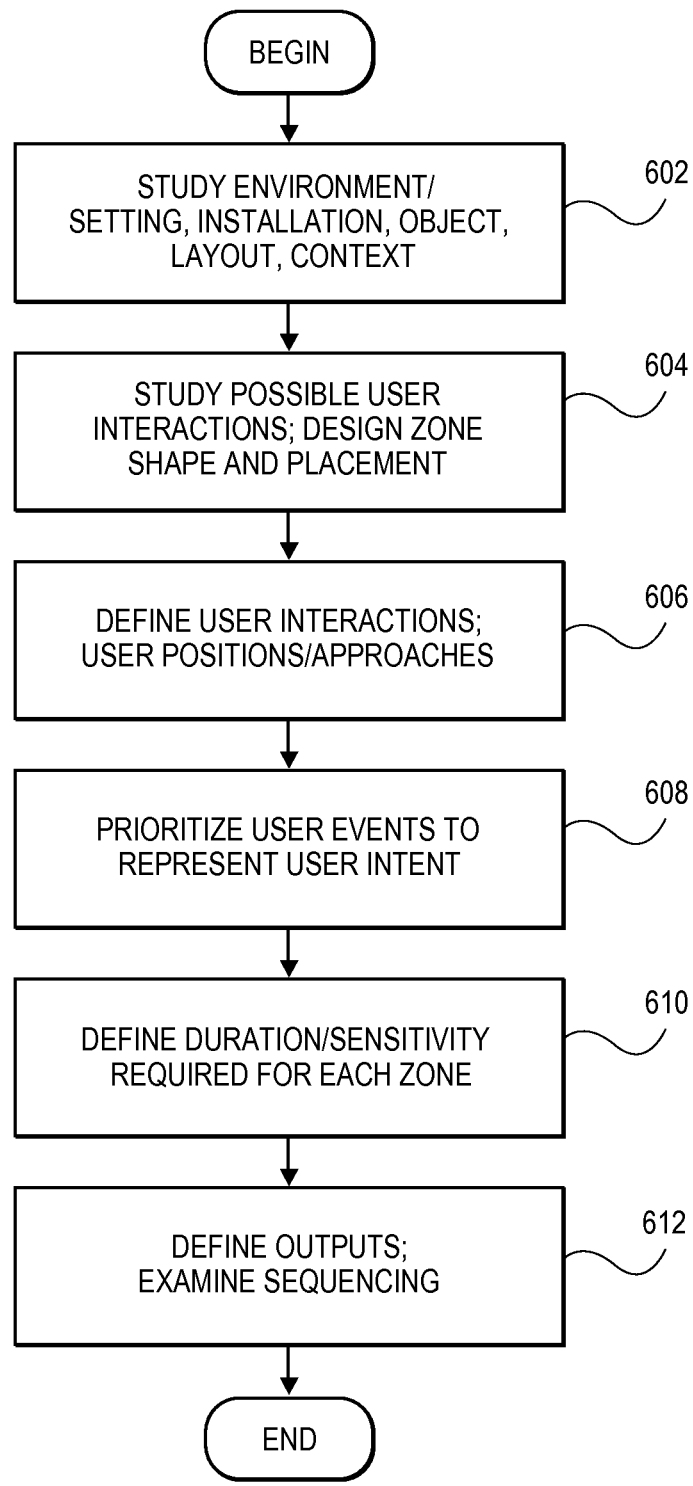
FIG. 6 is a flow diagram of a process of designing the interactive system, including examining the environment, possible user interactions, and overall system logic of the interactive system in accordance with one embodiment.

FIG. 6 is a flow diagram of a process of designing the interactive system, including examining the environment, possible user interactions, and overall system logic of the interactive system in accordance with one embodiment. Step 602 is made up of sub-steps and involves collaboration with the owner or operator of the interactive system installation, such as a retail store owner or a city agency. The interactive system provider first studies the installation space and environment, where the system will be installed. This may be a row of shelving, a wall, an appliance or product display area, a kiosk, a bus shelter, a movie promotion display in a theater, and so on. The provider may also study the placement of any object or product labels or signage, and how other information is conveyed to the user. The provider also studies the object or product. As noted above, the object could be a wall, an appliance door, a poster, a partition, a natural object, a grocery item, virtually any retail item ranging from cereal boxes to boats.

In all these varied scenarios, the provider studies the object(s) that users will interact with. Closely related to this is examining the layout, dimensions, size of the object/product and generally the context in which it will be shown in the installation. For example, if the product is box of a food item, are the boxes stacked on top of each other and, if so, how many are stacked, and on which shelf? Are the products arranged in rows and, if so, how far apart? How much space is there between shelves and what is the ratio of that space with respect to the size of the product? If the object is a partition or wall in a bus shelter, how large is the space on the wall which a typical user will interact with? At what height should that space be? As can be seen, the number of examples is endless.

The important common thread running through all the sub-steps in step 602 is close collaboration with the owner or client. Indeed, the owner dictates much of what the interactive system will look like and of course the objectives and goals of the system. The provider considers these objectives and environment/setting constraints and proceeds to the next step.

Step 604 is also done in some collaboration with the owner. The provider first studies all possible interactions a user will have with the objects. With help of the owner, it looks at how a user will most likely approach the object, how he will reach for it or interact with it, and what the user's intentions will likely be when interacting with it. The provider and owner may also determine possible non-intentional or accidental interactions with the object. For example, a user may move an arm or hand in front of the object or walked in front of a retail shelf without intending to interact with a product or object. Essentially, at step 604 the provider examines possible intentional and non-intentional interactions with the object. At step 604 the provider begins designing or blueprinting the placement configuration and shapes of the 3D zones taking into consideration possible interactions with the object. Step 604 may be described as closer examination of user interactions and initial designing or "sketching out" of the 3D zones.

At step 606, the provider begins the process of defining potential user interactions, user positions relative to the object, and how users may approach the object. Will the user likely walk straight to the object or approach from the side? Will the user approach it from the top of the zone, that is, will the user reach down to a bottom shelf to pick up the object or reach up, and so on. Will the user be standing in front of the object or will he be off to one side? Will the user swipe his hand from left to right or right to left. All these possible interactions, positions, and approaches with the object are defined and detailed by the provider in terms that can be used programmatically and to begin building the logic of the interactive system. As described above, this information is used to determine how one or more zones around the object will be activated and what types of interactions should not activate them.

At step 608 the provider prioritizes user events. It creates a hierarchy of user events or actions to represent the intent of the user. In one embodiment the interactive system should not activate (i.e., initiate an output event) unless interactions with the object by the user were intended by the user. In a sense the system wants to reduce the number of false positives. It only wants to activate when there is an intentional interaction with a user, not one that is accidental, incidental, or caused by noise. In order to do this, the system has a hierarchy of user events. At the top are user actions that are clearly intentional by the user where the user intends to interact with the object (touch it, pick it up, etc.). At the bottom are inadvertent movements of, for example, a body part in front of the object or an approach that is clearly not intentional (e.g., movement from the top when the object is on the top shelf in a store or movement from the bottom of a wall in a bus stop, and so on).

Staying at step 608, part of the process of prioritizing user events is to recognize that each zone designed has a pre-defined behavior. As such, a zone is not simply a defined volume of space relative to an object; it also has conditional logic and behavior. A zone will behave in a certain way depending on how it is interacted with. Similarly, a system of zones may also be described as having a certain behavior or logic as described in more detail below. The prioritization of user events plays a role in defining the behavior of a zone and a system of zones.

At this step the provider may also define the sequential logic of the zones. That is, when there is a system of zones, a user event that is intentional will likely require that a user disrupt a sequence of zones. Only if there is this specific sequence of zone intrusions, can a user event be discerned as intentional.

At step 610 the provider continues with building the logic of the interactive system by defining at least two factors required for triggering a zone. It defines what a zone has to sense in order to know that it is intentionally being interacted with. This is part of defining the zone's behavior. One of the factors is duration. How long must the user disrupt the zone with a user's hand. At step 610, following the same example, the provider determines how long the hand should be in the zone. This data enables the system to distinguish those user events that are intentional and non-intentional. A quick passing of a hand in a zone where a user is expected to reach for and pick up or touch an object (and where a hand or finger swipe is not expected) should not trigger an output event for the zone.

The other factor may be described as the degree of intrusion into the zone. How much into the zone must a user event be in order to trigger an event? In a kitchen appliance display, the owner may not want an event triggered unless the user reaches for the handle of an oven or fridge door. The user event has to be significant and essentially deep into the zone for it to be triggered. Similarly, if the owner wants an event triggered only if the user swipes across a wall, the user simply putting his hand up against the wall and not moving it will not trigger an event. The provider is determining the sensitivity of a zone intrusion to trigger an event. In many cases the provider, working in collaboration with the owner, performs real-world testing to see how users will interact with the object. How many seconds will the typical intentional user event take? How far into the zone will the user reach when intentionally interacting with the object? It is expected that the provider will re-calibrate or fine tune these data as it conducts such tests. In one embodiment, the provider determines thresholds for time and "fill" condition that must be exceeded in order to trigger an event for each zone.

In addition to exceeding the time and "fill" thresholds for a zone, there may be other heuristics to determine whether a zone is triggered, such as following the sequential logic of a series of zones described above where a zone intrusion meeting the threshold conditions is a pre-requisite for triggering a subsequent zone in the same zone system.

Step 610 is the last step in programming the logic of the interactive system where conditions for events are defined. At step 612 the provider defines the output events of when a zone is triggered. As described above, an event occurs when zone thresholds are exceeded. In most cases, the output event is an occurrence that is noticeable or observable by the user, although it does not have to be (e.g., it may be that the owner collects data "behind the scenes" when users interact with the object).

Figure 7:
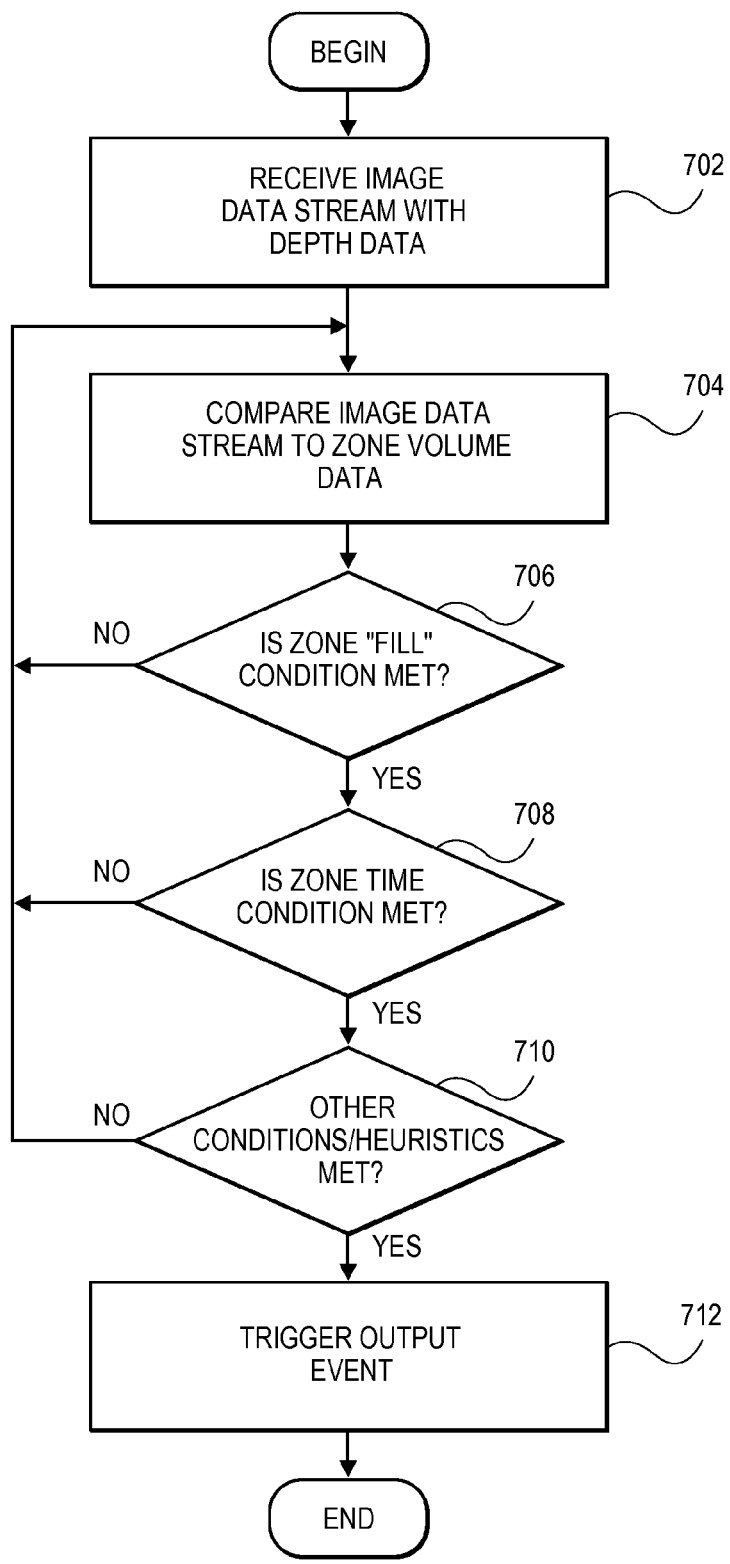
FIG. 7 is a flow diagram of a process of visualizing the 3D space around the object in the interactive system and determining trigger events in accordance with one embodiment.

At step 612, the provider works closely with the owner to define the output events, as described in more detail in FIG. 7. Different output events may occur (as instructed by different output logic) depending on the sequence of zone intrusion in cases where there are multiple zones that are dependent on each other. At this stage the process of examining aspects of the installation and object, and designing the interactive system logic is complete and processes of defining output events begins.

FIG. 7 is a flow diagram of a process of visualizing the 3D space around the object in the interactive system and determining trigger events in accordance with one embodiment. While steps in FIG. 6 are performed when designing and defining the interactive system before the system is up and running, FIG. 7 describes steps that occur during real-time operation of the system.

As described above, the system has certain types of cameras or other imaging devices positioned in a specific way as to capture depth data from user movements with respect to the objects. Returning to steps 604 and 606 where 3D zones are designed and user interactions are defined, another outcome is the placement of devices so that zones can be implemented and the necessary depth data can be captured.

At step 702 software components of the system receive the output data stream, primarily depth data, from the one or more cameras. Depending on the environment, setting, installation, and other form factors, different types of cameras, varying in size, sensitivity, power usage, and other factors, may be used to capture the necessary data. Modules of the present invention receive data streams from suitable devices (in one embodiment, there is nothing specific or customized about the data stream needed for the system; a conventional depth data stream from the device would be suitable). The data stream has coordinate data of the space in the camera frustrum.

At step 704 the interactive system software takes the incoming image data stream and compares it to one or more zone volumes. As noted above, a zone is defined using 3D coordinates, (x,y,z), relative to the camera rendering that zone. In one embodiment, the camera data shows depth information and may show other data as well, such as skeletal data. As is known in the field, depth data is also in a volume or 3D format, where an object in the 3D frustrum, such as a hand and forearm, is represented by 3D data.

At step 704 3D camera data is compared to zone volume data. This comparison will detect if a user disrupts a zone. In most cases this will be inserting a finger, hand, arm, head, torso, or whole body, into a zone. The system is essentially monitoring the virtual 3D zone space around an object to see if a user is trying to interact with the object. This monitoring (i.e., comparing of camera data to zone data) is done simultaneously for each zone in the system of zones.

The remaining steps in the process assume that there is some type of zone disruption as determined during the comparison at step 704. For clarity and ease of description, the steps below are described for a system that has one zone. This is followed by a description of a system of zones, which includes system logic, sequential rule sets, and additional conditions and heuristics.

At step 706 the system determines whether the degree and extent of the zone disruption meets a certain threshold. This may be described as checking whether the zone is filled to the extent needed to tell the system that there is an intentional interaction occurring with the object. For example, the threshold may be that 20% of the pixels in the zone must be disrupted in order to meet what may be referred to as the "fill" condition. If the fill condition is met, control goes to step 708. If not, control goes to step 704 where the system continues to monitor by comparing depth data with zone volume data.

At step 708 the system measures the duration of the zone intrusion. The zone intrusion has met the fill condition but must also meet a time requirement. This is to ensure that the intrusion is not incidental or accidental. For example, a user must break the pixels in the zone for a sufficient time to indicate that the intrusion was intended and that the user did not simply pass his hand or arm through a zone not intending to pick up or touch the object. The threshold amount of time may be measured in seconds or any suitable unit. In one embodiment, the system may start a timer as soon as it recognizes a fill condition in step 706. Once the timer passes the threshold amount of time while maintaining the fill condition, control goes to step 706. If the user moves out of the zone before the threshold time, control goes back to step 704.

At step 706 the system checks whether other conditions are met. These conditions may be referred to as additional heuristics. These heuristics, time and fill conditions are meant to measure user intent. The rules and heuristics are tailored to eliminate noise, accidents, and unintentional user movements. It is at this step where a system of rules dictating the behavior of a system of zones may be implemented. If the other conditions programmed into the system are met at step 706, an output event is triggered by the interactive system, that is, the system sends a signal or message to one or more electronic devices to perform pre-defined operations. The electronic devices and operations are selected by the owner. In many scenarios this may be showing a video on a nearby monitor or playing an audio file.

As shown above, the interactive system may have multiple zones leading up to the object or objects. This allows the system to execute a series of output events as the user approaches the object; it enables the system to give feedback from further away. That is, as the user gets closer to the objects. In a system of zones, the fill and time conditions of one zone may be pre-requisites for subsequent, typically closer, zones. The system logic may detect when a user enters one zone, typically the zone furthest away from the object. Once the first zone is disrupted, an output event may be triggered. For example, a light may come on partially illuminating the object display area or an audio file (e.g., playing only music) may play. The first zone does not have any conditions that depend on other zones, only the fill and time conditions described above. If the user continues approaching the object, a second zone is triggered. One of the conditions of the second zone is that the first zone be triggered. When this and other conditions are met, an output event for the second zone is triggered. For example, a second light may come on further illuminating the object and the audio file may go from music to an audio introduction of the object, such as a retail product. Finally, the user may be close enough to pick up or touch the object and thereby disrupt a third zone. A condition of the third zone may be that the first and second zones be triggered (or that only the second zone be triggered). When these and the fill and time conditions are met, a video plays on a nearby monitor and the audio playback provides further details on the product. This is simply one example of a system of zones having a sequential rule set, the collective rules of the individual zones where at least some of the zones essentially has a switch that is dependent on what happens in the other zones.

In another setting, the object is a flat surface, such as a monitor, that does not have "touch screen" functionality. As described above, the interactive zone system of the present invention provides interactive functionality to the monitor (or any surface) without conventional touch screen functionality. In this example, there may be different zone configurations and sequential rule sets to ensure that accidental triggers do not occur. For example, there may be one zone that is a foot away from the surface and a thinner, second zone that is only a half inch away from the surface. The rule set may require that the second zone only be triggered if the first zone is triggered ensure that there is a person standing in front of the surface who is breaking the second zone using a hand or finger which, in turn, may trigger a video being played on the monitor. If the second zone is triggered by something in the air (e.g., debris or a bird) that is not disrupting the first zone, then the video does not play.

In one embodiment, the zones are comprised of smaller 3D rectilinear shapes, such as cubes. These zone building blocks are configured to resemble or closely match the zone shape and dimensions required for the installation.

In one embodiment, there may be a sequence of output of events within a pre-defined period of usage. For example, if a zone is triggered n number of times within 1 minute or 30 seconds, it is likely that the same user is triggering the events (e.g., the same user touches or picks up the product). In this case, the system will play different videos. Each video progresses from the previous one, for example going into further detail about a product, instead of playing the same video (e.g., one introducing the product) each time. Other factors that the system may examine when determining what the output event should be may include time of day, temperature/weather conditions, foot traffic near the object display area, among others. Each of these and other conditions or factors that are relevant to the owner may influence output events, for example, which video or audio file to play or the amount of lighting.

As described above, a Zone Definition Process is generally done once by the interactive system provider and adjusted thereafter as needed. When initially setting up the interactive system of the present invention, the designer positions the sensor relative to the interactive object in a manner that captures objects, such as a user's hand, that will interact with the interactive object. In FIG. 5 two sensors 504 and 506 are placed overhead so that a hand or arm reaching to hold a handle on the refrigerator or microwave will be captured. In another example, a poster or painting may have sensors positioned at the edges of the installation. In other settings, the sensors may be placed below the interactive object. Once the sensor has been positioned relative to the interactive object, the interactive object itself is positioned. In other embodiments, as noted, the interactive object may be positioned first followed by positioning the sensors relative to the object.

As noted, a zone can take the form of various shapes. In the kitchen appliance example, the zones are essentially cubes. They may be any rectilinear shape, such as pyramidal, conical, tubular, and so on, that makes sense given the interactive object and the environment.

The position of the zone relative to the interactive object must also be determined and will generally be dictated by how users will interact with the object. In many cases they will use their hands or fingers, but a user may move their head or body into a region or use their legs or feet. These factors and others will determine, in part, where the zones should be positioned and what shape they should be. These factors will also determine the depth of the zone. For example, if the interactive object is a poster or banner and the provider wants users to bring their fingers very close to the surface but not touch the surface (to trigger an output event), then the zone may be thin and close to the surface of the poster. If the provider wants the event triggered when user's fingers or hands are six inches away from the surface, the zone may have a different depth. In another example, zones can create an analogue response to a user's movements. For instance, the closer a user gets to an interactive object, the louder or higher an audible pitch becomes, creating, for example, an interactive musical instrument.

The provider and owner may then define zone trigger conditions. Such conditions will typically include the magnitude of a change in a zone and the duration of the change, that is, determining how long the change lasted. In one embodiment, the magnitude may be measured by the number of pixels that have changed color in a zone and the duration may be the number of milliseconds the change in pixels lasted. Other conditions may include changes in other zones occurring at the same time or before changes to the current zone. For example, one condition may be that another zone, maybe one adjacent to the current zone, be triggered right before, indicating a hand making a horizontal or vertical swiping motion. Another example of a condition is the one noted above regarding an audible pitch becoming louder as a user comes closer to an object. The user's distance from the interactive object as the user causes changes in zones is another example of a condition. This concludes the zone definition process.

It may be implied from the description above that this process requires intelligence regarding the environment, the interactive object, and how people will interact with the object. Providers must then go through a process of determining the most effective positioning of the sensors, interactive object, and, most importantly, the shape, position, orientation, and depth of the zones. In addition, the conditions for triggering an output event based on changes to the zones must also be determined and also require similar intelligence and thought processes.

As noted, the zone definition process is generally done once. After the set-up has been designed and implemented, zone detection and analysis begins. This can be characterized as the normal, everyday use of the interactive system in which people approach the interactive objects and perform what are presumably natural and intuitive hand motions or gestures to begin interaction. The first step is continuous zone scanning. That is, the system is constantly scanning the zones to detect stimuli and proceed accordingly. In the kitchen appliance example shown in FIG. 5, all three depth sensors are continually scanning, even when there is no one near the appliance which, notably, does not need to be powered on or connected in any way to the sensors.

When a person or other object enters a zone, the zone receives stimulus. For example, a person may reach for a handle of an appliance or bring a hand or finger close to a surface. The stimulus can also be received from an inanimate object entering a zone, such as a ball, lever, or other mechanical component. Once stimulus in a zone or multiple zones is detected, the software checks for certain conditions.

As described above, two conditions that will likely be checked for in most cases are the magnitude and duration of the change in the zone. Both these factors are measured as soon as the stimulus is detected. In one embodiment, the magnitude may be measured by the number of pixels in a zone that change color indicating that something has entered a zone. For example, a condition may be that 30% of the pixels in a zone change. A timer can be used to measure how long the change continues. If the duration is below a certain threshold, for example 2 seconds, then the stimulus is ignored (it can be assumed that the stimulus was not part of an intentional interaction, but instead incidental or random). Other conditions or additional heuristics may also be utilized. For example, it may be required that a skeletal image be detected or that there be voice or other audio data as well. Sensor 508 in FIG. 5 takes on this role. Making a skeletal image as another condition provides a finer level of detection so that in cases where only a hand should trigger an event, an inanimate object entering the zone does not. If a skeletal image is not present or a voice is not detected, the zone is not stimulated or disrupted in a manner intended to trigger an output event.

As noted, there may be sequential rounds of sensing in different zones, each round being a condition for the next. One implementation of this is having layered zonal areas of different shapes where a first zone having a first shape must receive stimulus (meeting its own magnitude and duration conditions) before a second zone have a second shape can be triggered which, in turn, can be a pre-condition to a third zone being triggered, and so on. Certain zones may also have conditions that the zone receive stimulus at the same time as another zone.

If conditions have been met for a particular zone, then an event is triggered. If not, depth sensor continues scanning. An output event trigger interface (API) can be used to initiate one of many events as described above (e.g., media presentation, mechanical event, a game engine, etc.). This then leads to a presentation or some form of interactivity for the user. As described above, in the kitchen appliance setting, a video may play on the monitor depending on which zone is triggered. If the zone in front of the refrigerator handle is triggered, a media presentation describing that appliance can start playing and lights above the refrigerator may come on.

The present invention addresses the challenge of creating an interactive display that allows customers to manipulate appliances (or other objects/products), detect which controls are being used or touched, and display information on a monitor.

Figure 8A:
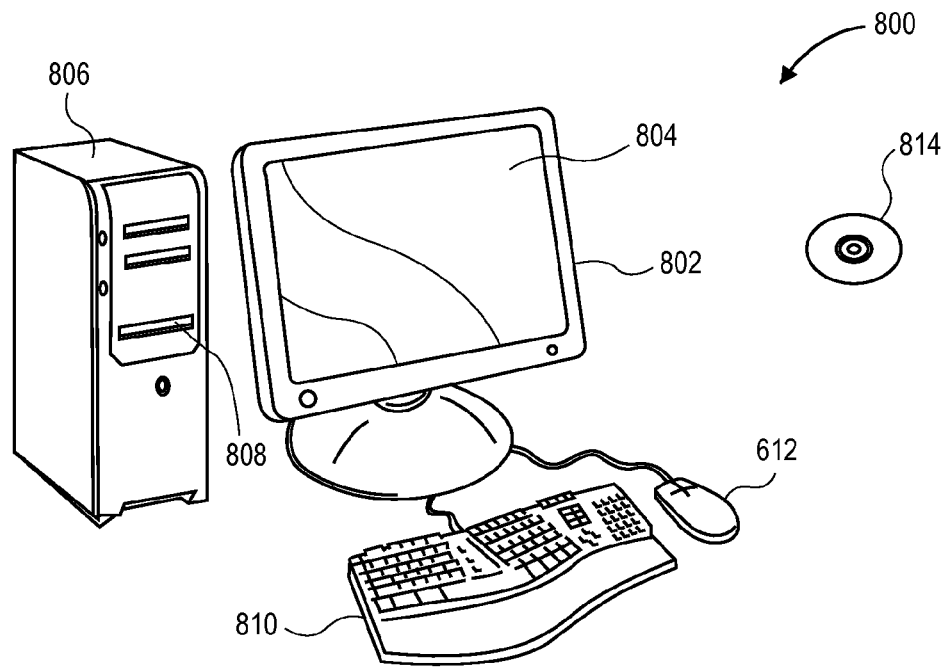
FIGS. 8A and 8B are block diagrams of a computing system suitable for implementing various embodiments of the present invention.
Figure 8B:
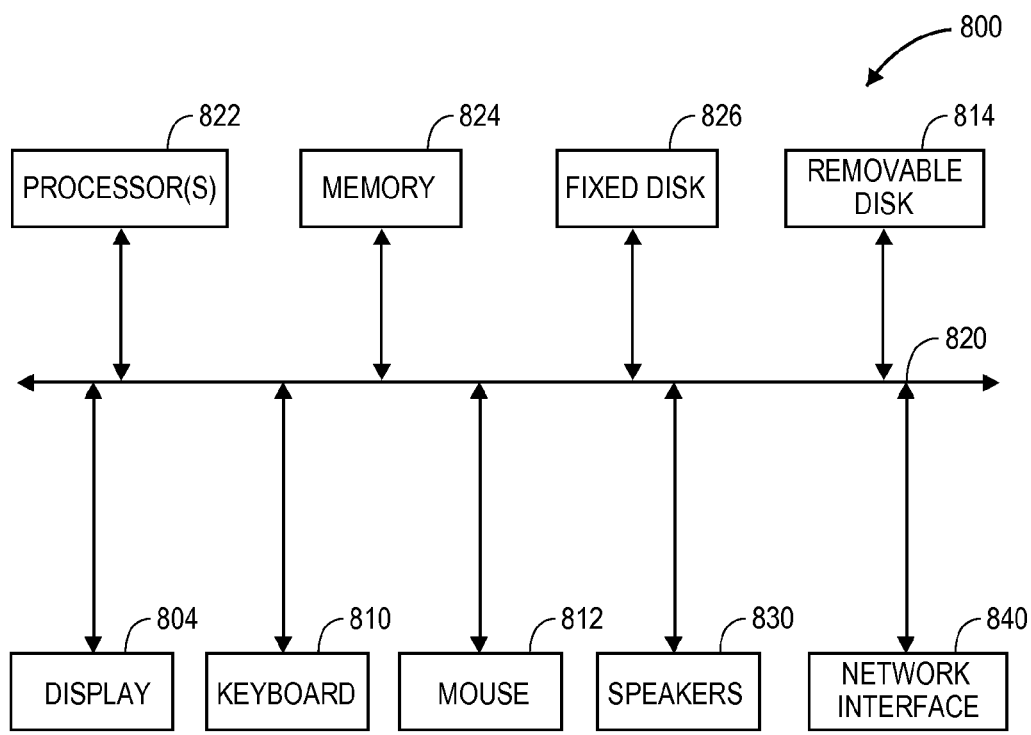

FIGS. 8A and 8B illustrate a computing system 800 suitable for implementing embodiments of the present invention. FIG. 8A shows one possible physical form of the computing system. Of course, the computing system may have many physical forms including a sole integrated circuit, a printed circuit board, a small handheld device (such as a mobile telephone, handset or PDA), a personal computer or a super computer. As such, embodiments of the present invention may not have certain components shown in FIG. 8A, such as the keyboard or monitor. Computing system 800 includes a monitor 802, a display 804, a housing 806, a disk drive 808, a keyboard 810 and a mouse 812. Disk 814 is a computer-readable medium used to transfer data to and from computer system 800.

FIG. 8B is an example of a block diagram for computing system 800. Attached to system bus 820 are a wide variety of subsystems. Processor(s) 822 (also referred to as central processing units, or CPUs) are coupled to storage devices including memory 824. Memory 824 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 826 is also coupled bi-directionally to CPU 822; it provides additional data storage capacity and may also include any of the computer-readable media described below. Fixed disk 826 may be used to store programs, data and the like and is typically a secondary storage medium (such as a hard disk) that is slower than primary storage. It will be appreciated that the information retained within fixed disk 826, may, in appropriate cases, be incorporated in standard fashion as virtual memory in memory 824. Removable disk 814 may take the form of any of the computer-readable media described below.

CPU 822 is also coupled to a variety of input/output devices such as display 804, keyboard 810, mouse 812 and speakers 830. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 822 optionally may be coupled to another computer or telecommunications network, or an output event component using an event trigger API using network interface 840. With such a network interface, it is contemplated that the CPU might receive information from the network, or might output information to the network in the course of performing the above-described method steps. Furthermore, method embodiments of the present invention may execute solely upon CPU 822 or may execute over a network such as the Internet in conjunction with a remote CPU that shares a portion of the processing.

Although illustrative embodiments and applications of this invention are shown and described herein, many variations and modifications are possible which remain within the concept, scope, and spirit of the invention, and these variations would become clear to those of ordinary skill in the art after perusal of this application. Accordingly, the embodiments described are to be considered as illustrative and not restrictive, and the invention is not to be limited to the details given herein, but may be modified within the scope and equivalents of the appended claims.

We claim:

1. A method of executing an output event in a zone-based interactive installation having an object and a sensor, the method comprising:
   receiving an image depth buffer stream from the sensor, said sensor positioned relative to the object, said depth buffer stream stored in a data storage component;
   comparing the depth buffer stream to zone volume data using a processor;
   determining whether a sensitivity threshold for a zone is exceeded by a user causing a change in the zone;
   determining whether a time threshold for the zone is exceeded by the user causing a change in the zone; and
   executing an output event in the zone-based interactive system, said output event related to said object and wherein said object is physically unconnected to the sensor and the processor and is powered off.

2. A method as recited in claim 1 wherein the zone volume data is relative to a sensor position in the interactive installation.

3. A method as recited in claim 1 further comprising:
   determining whether one or more zone logic conditions have been met by the user causing a change in the zone.

4. A method as recited in claim 3 wherein one or more zone logic conditions includes zone system logic for processing changes in multiple zones.

5. A method as recited in claim 1 further comprising:
   receiving skeletal data, audio data, or video data from an additional sensor.

6. A method as recited in claim 5 further comprising:
   combining time threshold and sensitivity threshold results with one or more of said skeletal data, audio data, and video data to correlate threshold results with image depth buffer stream data.

7. A method of defining and programming an interactive zone-based installation, the method comprising:
   examining installation environment and setting;
   defining a plurality of interactions between a user and an interactive object in the zone-based installation;
   defining placement of a zone with respect to the interactive object;
   prioritizing user interactions with the interactive object, wherein user intent is defined;
   determining a zone change time threshold for the zone;
   determining a zone change sensitivity threshold for the zone; and
   defining an output event to occur when a zone change exceeds time threshold and sensitivity threshold.

8. A method as recited in claim 7 further comprising:
   examining the interactive object and object placement and orientation in the installation.

9. A method as recited in claim 7 wherein the sensor is mechanically and electronically unconnected to the interactive object and wherein the interactive object is unpowered.

10. A method as recited in claim 7 wherein defining zone placement with respect to the interactive object further comprises:
    determining a sensor location/orientation in the installation.

11. A method as recited in claim 7 further comprising:
    defining additional conditions to trigger an output event.

* * * * *